UNITED STATES PATENT OFFICE.

CONRAD SCHRAUBE AND CARL SCHMIDT, OF LUDWIGSHAFEN, GERMANY, ASSIGNORS TO THE BADISCHE ANILIN AND SODA FABRIK, OF SAME PLACE.

NITROSAMIN COMPOUND.

SPECIFICATION forming part of Letters Patent No. 531,973, dated January 1, 1895.

Application filed July 30, 1894. Serial No. 519,024. (Specimens.) Patented in France November 13, 1893, No. 234,029.

*To all whom it may concern:*

Be it known that we, CONRAD SCHRAUBE and CARL SCHMIDT, doctors of philosophy, subjects of the King of Prussia, German Emperor, residing at Ludwigshafen-on-the-Rhine, in the Kingdom of Bavaria and Empire of Germany, have invented new and useful Improvements in the Manufacture of New Nitrosamin Compounds, (for which patent has been obtained in France, No. 234,029, dated November 13, 1893, certificats d'addition of February 5, 1894, and June 11, 1894,) of which the following is a specification.

In the production of certain shades of color by means of one well-known process the dyer combines diazo-compounds with amins or phenols on or in the presence of the fiber itself. Now since the diazo-compounds generally are an extremely unstable class of bodies, it is necessary that they should be prepared in the dyeing factory, as they cannot practically be transported. The preparation of the diazo-compounds for the purpose in question is frequently an inconvenient or difficult matter as the best result can only be attained by careful and accurate observance of certain narrowly bounded conditions. Moreover the conditions which are best for obtaining the diazo-compounds sometimes yield these bodies admixed with acids and salts in such quantity that the product is not well suited for use in the dyeing process mentioned.

We have discovered that on treating diazo-compounds such as are hereinafter more particularly defined with caustic alkalies they are converted ultimately into the alkali-salts of the isomeric nitrosamins which compounds can easily be isolated and possess considerable stability. These constitute a new class of compounds and are characterized by the following generic properties: They are soluble in water, giving a somewhat alkaline solution and yield practically no dye in aqueous solution with a solution of naphthol in an excess of alkali. By treatment with the equivalent proportion of an acid in many cases these alkali-salts are converted into the free nitrosamin which is less stable than the alkali-salt but can in some cases if desired be prepared in the solid state and used in the form of paste. On treatment with a larger proportion of acid preferably in the presence of a little nitrous acid, the bodies of this new class are smoothly and readily reconverted into the corresponding diazo-compounds. Thus by the aid of our invention it is possible to prepare stable compounds capable of transport which can easily be converted into diazo-compounds ready for use in the aforesaid dyeing process. Further in addition to these advantages mentioned our new nitrosamins can be used in entirely new ways for the production of dyes on the fiber. For this purpose the nitrosamin in the form of salt is mixed with beta-naphthol or other suitable component and this mixture is printed on the fiber and the color developed by means of a weak acid such as acetic acid or the carbonic acid of the atmosphere. In some cases this application constitutes the principal use of our new nitrosamins.

The processes above described for the production of our new nitrosamins can be applied to a large variety of diazo-compounds. The conversion into nitrosamin is most easily effected in the case of the diazo-compounds which contain one or more acid substituting groups such as nitro-groups, or two or more halogens and the like. Thus for instance the diazo-compounds from the nitro-anilins, dichloro-anilin, nitro-benzidin and the like can be converted into the corresponding nitrosamins of the new class by treatment with caustic soda at the ordinary temperature. On the other hand the diazo-compounds from anilin, toluidin, naphthylamin, benzidin and the like which contain no acid substituting groups must be heated with strong alkalies at the temperature of the water-bath or higher in order to effect the desired conversion. Between these two extreme groups of diazo-compounds there are ranked sulfoacids and all such diazo-compounds as contain on the whole less strongly acid substituting groups than those first mentioned such for instance as the diazo-compounds from sulfanilic acid, para-brom-anilin and the like, and these can be converted into the nitrosamin of the new class by treatment with caustic alkali at a temperature intermediate to that preferably employed when using diazo-compounds belonging to the extreme groups previously referred to.

We have discovered that speaking generally the temperature required for the conversion of diazo-compounds into our new nitrosamin-compounds varies according to the acidity of the substituting groups; the conversion being the more readily effected the more strongly acid an effect these are capable of producing under the circumstances of the reaction.

By this specification we intend to claim generally the nitrosamins resulting from the treatment of the diazo-compounds herein defined with caustic alkalies and also to claim specifically the nitrosamin derived from para-nitro-anilin. These nitrosamins are intended to be claimed not only in the form of their salts but also in the free state; but save in so far as they are generically claimed we make no claim in this application for patent to the other members of the new class of bodies herein mentioned.

Among the nitrosamin compounds generically claimed are included the nitrosamin compound derived from benzidin which is specifically claimed in an application for a patent filed by us July 30, 1894, Serial No. 519,023; also the nitrosamin compound derived from para-dichloro-anilin which is specifically claimed in an application for a patent filed by us July 30, 1894, Serial No. 519,025; also the nitrosamin compounds derived from alpha and beta naphthylamin which are claimed specifically in an application for a patent filed by us July 30, 1894, Serial No. 519,026; also the nitrosamin compound derived from dianisidin which is claimed specifically in an application for a patent filed by us July 30, 1894, Serial No. 519,027.

The following examples will serve to illustrate the manner in which the invention can be carried into practical effect and our new nitrosamin compounds obtained. The parts are by weight.

*Example I. Production of a nitrosamin from the diazo-compound of para-nitro-anilin.*—Run a solution containing say about ten per cent. (10%) of the diazo-compound derived from para-nitro-anilin obtained in the usual way, into cold caustic soda lye (containing about eighteen per cent. (18%) NaOH) taking sufficient of this lye that the resulting mixture is still strongly alkaline. The new nitrosamin separates out in the form of its sodium salt which is only slightly soluble in the alkaline liquid. Filter, press and dry or preferably preserve for use in the form of paste. If necessary common salt may be added to the mother liquor in order to precipitate any nitrosamin remaining therein. Our new para-nitro-phenyl-nitrosamin thus obtained as sodium salt possesses all the generic properties hereinbefore mentioned. It occurs as a yellowish powder or paste readily soluble in pure water. On treatment with one molecular proportion of an acid it is converted into the free nitrosamin. With an excess of acid particularly in the presence of nitrous acid it is reconverted into the diazo-compound. The presence of this nitrous acid can be conveniently secured by adding to the commercial nitrosamin a small proportion of sodium nitrite. On treating the sodium salt with methyl-iodid the nitrosamin of para-nitro-mono-methyl-anilin is obtained.

In the above example the conversion of the diazo-compound into the nitrosamin takes place practically instantaneously but in the case of any diazo-compound the course of the reaction can be ascertained by treating a test portion of the mixture with sodium beta-naphtholate. If coloring matter is formed it indicates the presence of unchanged diazo-compound, but if practically no coloring-matter is formed the transformation of the diazo-compound into the isomeric nitrosamin may be regarded as complete.

As instances of diazo-compounds which can advantageously be treated in the manner described in the foregoing example we mention the isomeric nitro-anilins, dinitro-anilin, dinitro-benzidin, nitro-amido-benzene-sulfoacid, nitro-amido-benzene carboxylic acid, dichloro-anilin and picraminic acid and the like. Of course in each case variation can be introduced into the process. Thus for instance where the resulting nitrosamin is readily soluble in the alkaline mother liquor it can usually be precipitated by the addition of caustic soda or in some cases as for instance with the nitrosamin derived from dichloroanilin the solution can be concentrated by evaporation.

*Example II. Production of a nitrosamin from diazo-sulfanilic acid.*—Mix together about ten (10) parts of diazo-sulfanilic acid paste (containing twenty five per cent. (25%) diazo-compound) with about fifteen (15) parts caustic soda lye (containing about twenty per cent. (20%) NaOH). Heat the solution so obtained rapidly to a temperature of about eighty five degrees centigrade (85° C.) and maintain the heat until the above described test with sodium beta-naphtholate shows that no further diazo-compound is present. The sodium salt of the nitrosamin begins to separate already at the high temperature. Allow it to cool when the separation becomes more complete, filter, press and dry or preserve for use in the form of paste. The nitrosamin thus obtained is a slightly yellowish crystalline body possessing all the generic properties hereinbefore set forth.

In a manner similar to that described in the foregoing example, the nitrosamin can be obtained from diazo-para-brom-anilin, diazo-naphthionic acid and the like. In this last case it is well to heat the caustic soda solution to the desired temperature before mixing in the diazo-compound.

*Example III. Production of a nitrosamin from tetrazo-diphenyl.* — Mix thoroughly about sixty (60) parts of benzidene with about two hundred and forty (240) parts of hydrochloric acid (containing about twenty eight per cent. (28%) of real acid HCl). Cool the mixture by external cooling to about minus five degrees centigrade (—5° C.) then add about one hundred and twenty (120) parts of powdered ice and diazotize by adding about fifty (50) parts of solid sodium nitrite. Filter the tetrazo-solution so obtained and allow it to run slowly into a mixture of five hundred (500) parts of caustic soda lye containing about thirty five per cent. (35%) of sodium hydrate with about one hundred and fifty (150) parts of solid caustic soda. Stir the solution thoroughly while running in the tetrazo-solution and keep it cool by external cooling. The temperature must not ever exceed about ten degrees centigrade (10° C.). During the operation about one hundred and fifty (150) parts more of caustic soda are added gradually to the mixture. A pasty mixture is so obtained. In the meantime prepare a mixture of about two hundred (200) parts of solid caustic soda and about two hundred (200) parts of caustic soda lye containing about thirty-five per cent. (35%) NaOH and heat this mixture directly to about one hundred and sixty degrees centigrade (160° C.). Add the pasty mass obtained as above described gradually to this hot solution while constantly stirring. Add gradually during the operation also four hundred (400) parts of caustic soda and so regulate the temperature that it is maintained between one hundred and fifty five and one hundred and sixty degrees centigrade (155° to 160° C.). When no tetrazo-diphenyl can be recognized by the test with sodium naphtholate, allow the mixture to cool to about one hundred degrees centigrade (100° C.) and then dilute with sufficient water to render it possible to filter off the caustic liquor from the formed nitrosamin-salt. Filter hot, collect the nitrosamin-salt, press and dry at a temperature of about fifty degrees centigrade (50° C.).

By applying our new process in the manner illustrated in the foregoing example the new nitrosamins can for instance be obtained from the diazo-compounds of anilin, ortho and para toluidin, para-anisidin, alpha and beta naphthylamin, dianisidin and the like.

In the above examples caustic potash can be used instead of caustic soda. Further the alkaline carbonates or the caustic alkaline earths can in some cases be applied when the corresponding nitrosamin salts are obtained. This latter substitution can be adopted in the case of the diazo-compounds capable of conversion in the manner described in Example I.

Now, what we claim is—

1. The process for the manufacture of the nitrosamins of the primary amins by treating the diazo-compounds hereinbefore defined such as diazo nitro anilin for example with a caustic alkali.

2. As new articles of manufacture the new class of bodies which are chemically the nitrosamins of the primary amins and can be derived from the diazo-compounds thereof, and which in the form of sodium salt are soluble in water with somewhat alkaline reaction and produce no azo-dye in the presence of beta-naphtholate of sodium and alkali but on treatment with an excess of acid are converted into the corresponding diazo-compound which yields coloring-matter on combination with beta-naphtholate of sodium.

3. As a new article of manufacture the specific para-nitro-phenyl-nitrosamin which can be derived from the diazo-compound of para-nitro-anilin and which occurs as a yellowish paste or powder and in the form of sodium salt is readily soluble in water, and on treatment with one equivalent of an acid is converted into free nitrosamin but with an excess of acid especially in the presence of a trace of nitrous acid into the corresponding diazo-compound and which on treatment with methyl iodid is converted into the nitrosamin of para-nitro-mono-methyl-anilin.

In testimony whereof we have hereunto set our hands in the presence of two subscribing witnesses.

CONRAD SCHRAUBE.
CARL SCHMIDT.

Witnesses:
ERNEST F. EHRHARDT,
ADOLPH REUTLINGER.